United States Patent [19]
Vansaghi

[11] Patent Number: 5,499,064
[45] Date of Patent: Mar. 12, 1996

[54] VISUAL AID DEVICE HAVING A LOCKING DEVICE

[75] Inventor: Ronald E. Vansaghi, Arlington, Tex.

[73] Assignee: Paralax, Inc., Scarsdale, N.Y.

[21] Appl. No.: 188,307

[22] Filed: Jan. 28, 1994

[51] Int. Cl.$^6$ ........................................... G02C 1/00
[52] U.S. Cl. ........................ 351/158; 351/41; 351/57
[58] Field of Search ............................. 351/158, 47, 57, 351/41; 359/399

[56] References Cited

U.S. PATENT DOCUMENTS

| | | | |
|---|---|---|---|
| 2,024,322 | 12/1935 | Wittig | 351/158 |
| 4,195,918 | 4/1980 | Freche et al. | 351/158 |
| 4,834,525 | 5/1989 | Vansaghi | 351/57 |

*Primary Examiner*—William L. Sikes
*Assistant Examiner*—Hung Xuan Dang
*Attorney, Agent, or Firm*—Mark Catan; Thomas R. Morrison

[57] ABSTRACT

An eyeglass frame supports a pair of mounting adapters. Each mounting adapter includes a connecting mechanism for removably connecting an optical device. The connecting mechanism permits the optical device to be inserted with a low insertion force, but requires a relatively large force for removing the optical device. The connecting mechanism includes an interior bore that accepts an insertion shank on the optical device. A series of Teflon balls are placed in radial channels in an outer wall of the mounting adapter. An O-ring in a groove in the outer wall urges the Teflon balls into the radial channels. The radial channels are shaped to prevent the Teflon balls from falling into the insertion bore, but allow the Teflon balls to protrude partly into the insertion bore. The insertion shank of the optical device has a bevel that forces the Teflon balls out of its path as it is inserted into the interior bore. At a point during insertion, the Teflon balls fall into a second groove behind the bevel, temporarily locking the optical device in place.

23 Claims, 4 Drawing Sheets

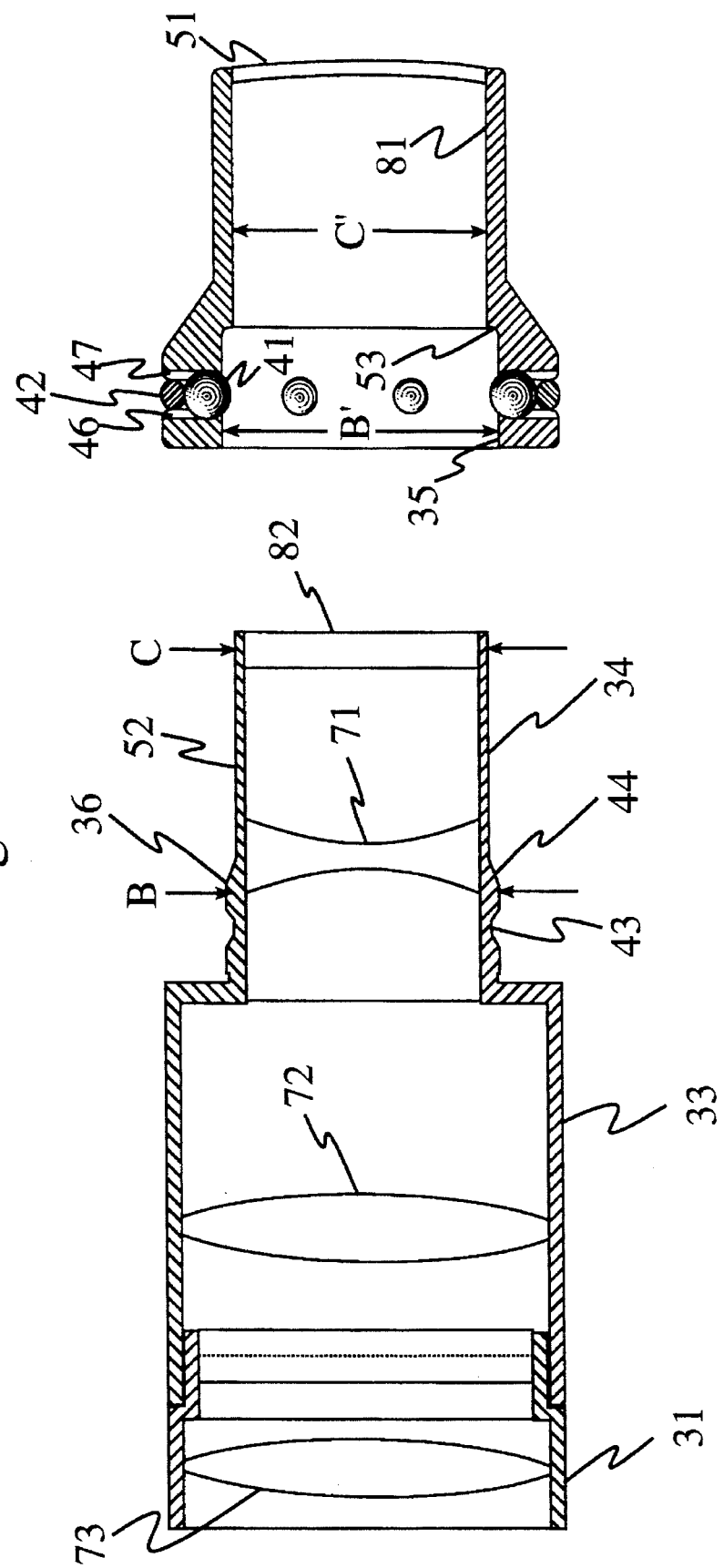

VISUAL AID DEVICE HAVING A LOCKING DEVICE

BACKGROUND OF THE INVENTION

The present invention relates generally to optical devices and specifically to wearable visual aids.

The performer of fine, detailed work, such as surgery or watchmaking, is helped by visual aid devices that reduce eye fatigue and increase visual acuity. One such visual aid device is disclosed in U.S. Pat. No. 4,834,525 issued May 30, 1989 to Vansaghi. Referring to FIG. 1, a visual aid device 10 features telescopes 121, 123 mounted on eyeglass frames 111 via carrier lenses 117, 119. Carrier lenses 117, 119 may be prescription lenses to provide visual correction to permit a visually impaired user to see through the portions of carrier lenses 117, 119 peripheral to the areas covered by telescopes 121, 123. Since carrier lenses 117, 119 may be prescription lenses, visual correction is provided for such peripheral viewing. In addition, referring also to FIG. 2, corrective lenses 137 may be affixed to bushings 127 to provide visual correction during viewing through telescopes 121, 123.

Visual aid device 10 may be designed specifically for a particular user to accommodate his anatomical and visual correction needs. However, the ideal optical characteristics of such devices depend on the particular task as well as on the particular user. For example, a cardiovascular surgeon may require telescopes having different optical characteristics than required by a dentist. Such optical characteristics include the focusing or working distance, the distance from the user's eyes to the region being observed, and the magnification factor. Moreover, the same specialist might require telescopes with different optical characteristics for different tasks, such as a dentist who performs both chairside surgery and laboratory bench work. Such customization may require that separate devices be purchased for each user or task. Such multiple purchases involve considerable expense, especially when carrier lenses 117, 119 and corrective lenses 137 are manufactured especially for a particular user.

To solve this problem, visual aid device 10 has been designed with interchangeable telescopes. Telescopes 121, 123 are removably mounted on respective carrier bushings 125, 127 by means of bayonet-type mounts. The bayonet-type mount includes a front portion 131 of bushing 127, which is a female member that receivably mates with a male member 139 at an end of telescope 123. An interior bore 141 of bushing 127 has a circumferential groove 143 for receiving mating tabs 145 of male member 139. An outer wall 132, which bounds circumferential groove 143, has slots 152 to permit mating tab 145 to enter circumferential groove 143. Telescope 123 is pushed toward bushing 127 as male member 139 is inserted in interior bore 141 until mating tabs 145 pass through slots 152. Telescope 123 is then rotated 1/8th of a turn to slide mating tabs 145 in circumferential groove 143 and lock behind solid portions 153 of outer wall 132. A detente mechanism (not shown) locks mating tabs 145 in position so that telescope 123 cannot thereafter be rotated easily. Thus, telescope 123 cannot fall out.

Though the prior-art device of FIGS. 1 and 2 permits lenses to be interchanged, positive locking of the lens may not be achieved. If telescope 123 is rotated insufficiently to engage the detente device, telescope 123 will stay in place for a time, but it will not be positively locked in place. If not locked in place, telescope 123 can fall out of interior bore 141 during use. If telescope 123 should fall out during surgery or some other delicate work, great hardship could result.

In addition to making it possible for telescope 123 to fall out of place during use, the bayonet-type mount requires telescope 123 to be rotationally as well as axially aligned with the bushing, inserted and then twisted, which is inconvenient.

Another problem with the prior art visual aids is the difficulty of compensating for axial misalignment of telescopes 121, 123. Telescopes invariably incorporate some axial misalignment due to manufacturing tolerances causing the line of sight of the telescope to be different from that for which the mount is ideally configured. Such misalignment can result in poor imaging and/or eye fatigue.

Still another problem with the prior art device is that no means is provided for changing the force required to insert and rotate mountings such as the bayonet mount of the prior art. This may present a difficulty for users who prefer easier and faster changing telescopes 121, 123.

OBJECTS AND SUMMARY OF THE INVENTION

It is an object of the present invention to overcome the drawbacks of the prior art.

It is another object of the invention to provide a wearable visual aid device that permits the use of interchangeable optical devices.

It is still another object of the present invention to provide a through-the-lens mounting mechanism for interchangeable optical devices for wearable visual aid devices.

It is still another object of the present invention to provide a through-the-lens mounting mechanism for interchangeable optical devices for wearable visual aid devices that prevents accidental disengagement of an interchangeable optical device.

It is still another object of the present invention to provide an afocal telescope which becomes a complete telescope with selectable focusing distance upon attachment of an insert lens.

Briefly stated, the invention provides an eyeglass frame that supports a pair of mounting adapters. Each mounting adapter includes a connecting mechanism for removably connecting an optical device. The connecting mechanism permits the optical device to be inserted with a low insertion force, but requires a relatively large force for removing the optical device. The connecting mechanism includes an interior bore that accepts an insertion shank on the optical device. A series of Teflon balls are placed in radial channels in an outer wall of the mounting adapter. An O-ring in a groove in the outer wall urges the Teflon balls into the radial channels. The radial channels are shaped to prevent the Teflon balls from falling into the insertion bore, but allow the Teflon balls to protrude partly into the insertion bore. The insertion shank of the optical device has a bevel that forces the Teflon balls out of its path as it is inserted into the interior bore. At a point during insertion, the Teflon balls fall into a second groove behind the bevel, temporarily locking the optical device in place.

According to an embodiment of the present invention, there is disclosed, a visual aid, comprising: a wearable frame for holding an optical device near a wearer's eye, a mounting adapter, having an opening, fixedly connected to the frame, an optical device having an insertion shank at an end thereof, the insertion shank being insertable in the mounting adapter, means for engaging the insertion shank upon application of a first force in a first direction to the insertion shank while the insertion shank is inserted in the opening, the means for engaging including means for disengaging the insertion shank upon application of a second force to the insertion shank while the insertion shank is inserted in the opening and the second force being greater in magnitude than, and opposite in direction to, the first force.

According to another embodiment of the present invention, there is disclosed, a visual aid, comprising: a spectacle frame, a carrier lens fixedly mounted in the spectacle frame, a mounting adapter fixedly attached to the carrier lens, the mounting adapter having an interior bore, an annular outer wall and a center axis, at least one engaging member movably connected to the mounting adapter, means for urging the engaging member partly into the interior bore, an optical device having an insertion shank, the insertion shank being insertable into the interior bore and the insertion shank having an annular edge for engaging the engaging member when the insertion shank is inserted in the interior bore.

According to still another embodiment of the present invention, there is disclosed, a visual aid, comprising: a wearable frame, an afocal telescope, a main lens in the afocal telescope, an insert lens attachable to the afocal telescope, a mounting adapter attached to the wearable frame, the mounting adapter having means for attaching a corrective lens on the mounting adapter, the afocal telescope being incapable of bringing a subject into focus for a normally-sighted user of the visual aid and the afocal telescope with the insert lens attached being capable of bringing the subject into focus for the normally-sighted user of the visual aid.

According to still another embodiment of the present invention, there is disclosed, a visual aid, comprising: a wearable frame, an afocal telescope, a main lens in the afocal telescope, an insert lens attachable to the afocal telescope, a mounting adapter attached to the wearable frame, the mounting adapter having means for attaching a corrective lens on the mounting adapter, the mounting adapter having an opening, the afocal telescope being incapable of bringing a subject into focus for a normally-sighted user of the visual aid, the afocal telescope with the insert lens attached being capable of bringing the subject into focus for the normally-sighted user of the visual aid, the afocal telescope having an insertion shank at an end thereof, the insertion shank being insertable in the opening in the mounting adapter, means for engaging the insertion shank upon application of a first force in a first direction to the insertion shank while the insertion shank is inserted in the opening, the means for engaging including means for disengaging the insertion shank upon application of a second force to the insertion shank while the insertion shank is inserted in the opening and the second force being greater in magnitude than, and opposite in direction to, the first force.

According to still another embodiment of the present invention, there is disclosed, a visual aid comprising: a mounting adapter, means for supporting the mounting adapter in a line of sight of a user, an optical device, means for permitting attachment of the optical device in the mounting adapter, and for removing the optical device from the mounting adapter, the means for permitting including means for locking the optical device in a locking position in the mounting adapter when the optical device is fully attached in the mounting adapter and the means for permitting attachment including means for requiring a greater force to remove the optical device from the locking position than for attaching the optical device in the locking position.

According to still another embodiment of the present invention, there is disclosed, a telescope comprising: an afocal telescope, an insert lens assembly mountable on the afocal telescope, the insert lens assembly having a focal length effective, together with the afocal telescope, to permit production of an image at a selectable distance and a corrective lens having a shape effective to correct for a visual impairment of a user.

According to still another embodiment of the present invention, there is disclosed, a visual aid, comprising: a wearable frame, a mounting adapter affixed to the wearable frame, a telescope, the mounting adapter including means for rotatably connecting the telescope to the mounting adapter, the means for rotatably connecting including means for permitting removal of the telescope from the mounting adapter.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7 is a section view of a telescope and mounting adapter of the embodiment of FIG. 3.

DETAILED DESCRIPTION OF THE PREFERRED EMBODIMENT

Figure 1:
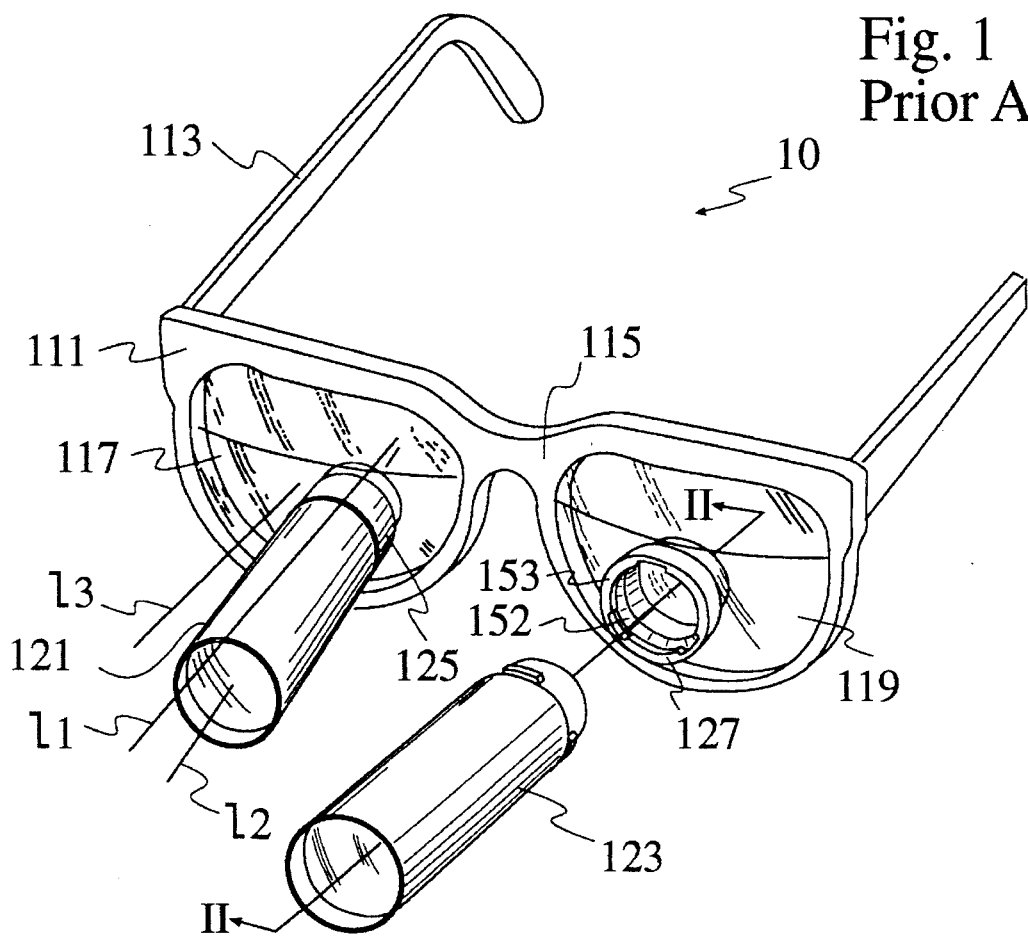
FIG. 1 is perspective view of a wearable visual aid device according to the prior art.
Figure 2:
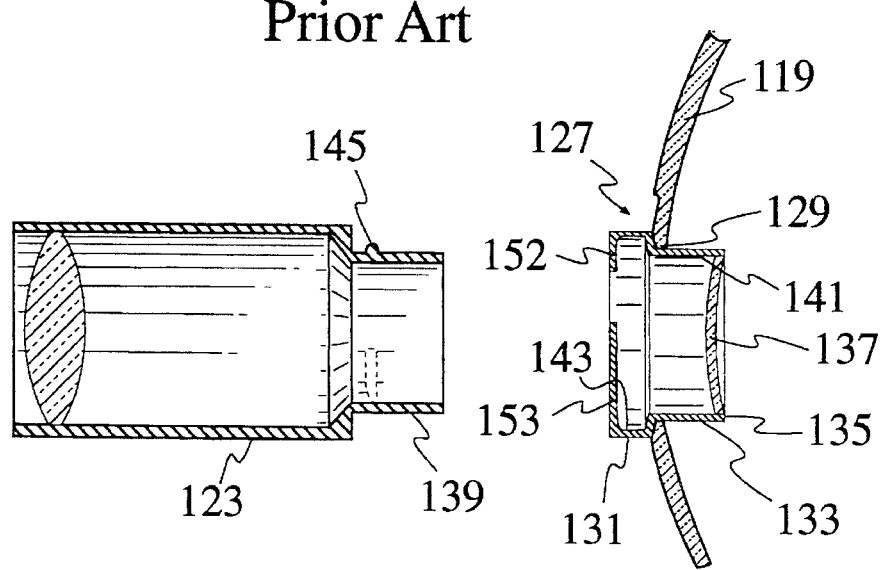
FIG. 2 is a section view of the wearable visual aid device of FIG. 1 taken along line II—II shown in FIG. 1.
Figure 3:
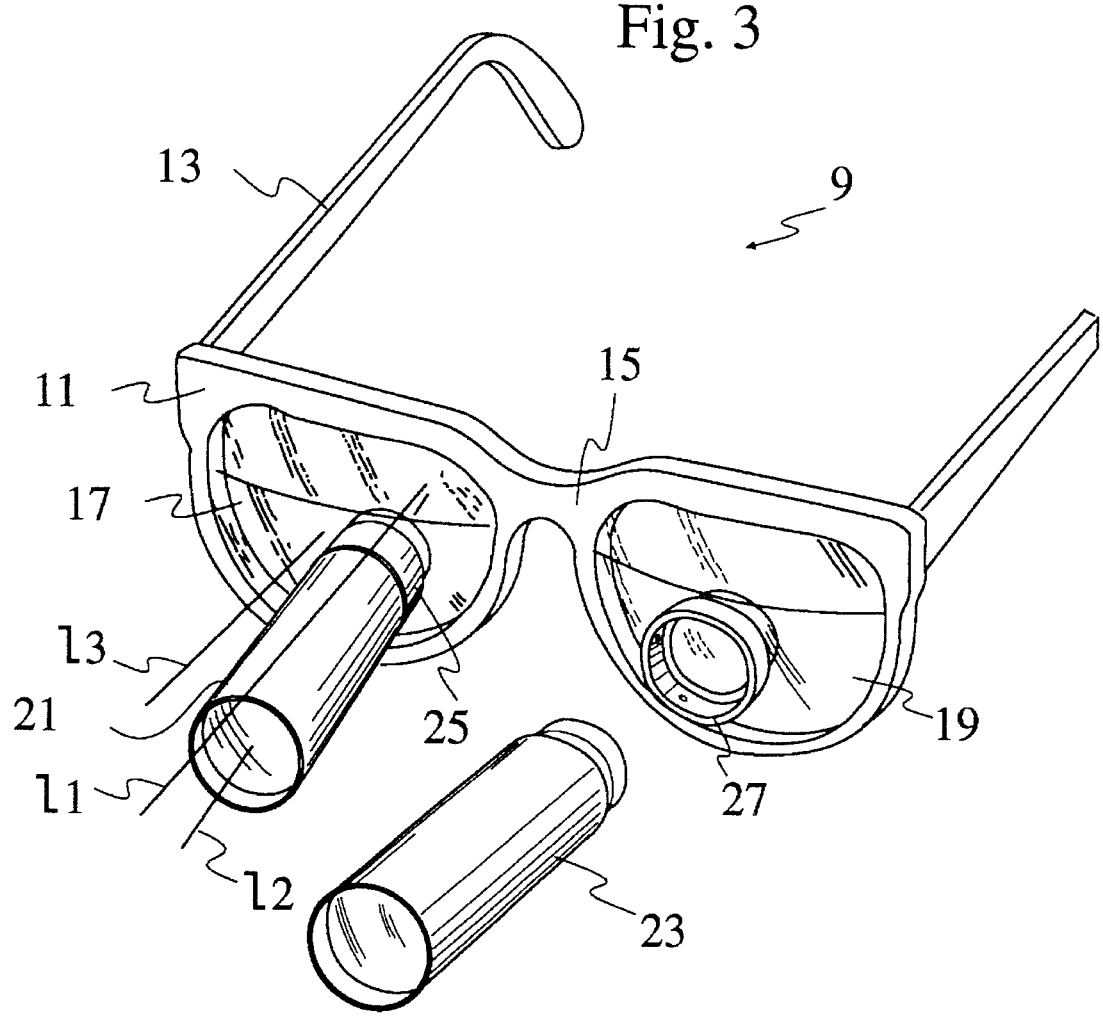
FIG. 3 is perspective view of a wearable visual aid device according to the present invention.

Referring to FIG. 3, a visual aid device 9 includes a frame 11 with temple pieces 13 and a nose bridge 15. Carrier lenses 17, 19 are held in frame 11. Each of carrier lenses 17, 19 has a respective one of a pair of mounting adapters 25, 27. Each of mounting adapters 25, 27 holds one of a pair of optical devices such as telescopes 21, 23.

Carrier lenses 17, 19 may be made of plastic or ground glass and may be shaped to correct for visual impairment. In the embodiment shown in FIG. 3, carrier lenses 17, 19 are bifocal corrective lenses. In another embodiment, not shown, carrier lenses have an optically neutral shape, for users who do not require correction.

Frame 11 and carrier lenses 17, 19 are preferably made of heat and chemical resistant materials to allow them to be sterilized when telescopes 21, 23 are removed. A preferred material for frame 11 is powder coated aluminum which is heat tolerant, light-weight and has a non-oxidizing surface. The non-oxidizing powder-coated surface would not contribute to particulate contamination of clean environments such as surgical theaters and manufacturing clean rooms.

In preferred embodiment, frame 11 is provided with means for changing carrier lenses 17, 19. The ability to change carrier lenses 17, 19 permits a user to install carrier lenses 17, 19 in a new frame 11 if frame 11 should be damaged. This may save the cost of new carrier lenses 17, 19 and mounting adapters 25, 27. Also, it is preferred for Mounting adapters 25, 27 are permanently mounted in respective apertures (not shown) in carrier lenses 17, 19. Angles of mounting of mounting adapters 25, 27 determine respective viewing angles through telescopes 21, 23. These angles should be established so that lines of view converge at the focusing distance of the telescopes 21, 23 mounted in mounting adapters 25, 27. Determining the best angles for mounting mounting adapters 25, 27 is a skill known in the art. This skill is explained in U.S. Pat. No. 4,834,525 issued May 30, 1989 to Vansaghi and U.S. Pat. No. 3.273,456 issued Sep. 20, 1966 to Feinbloom, the disclosures of which are incorporated herein by reference.

Figure 4:
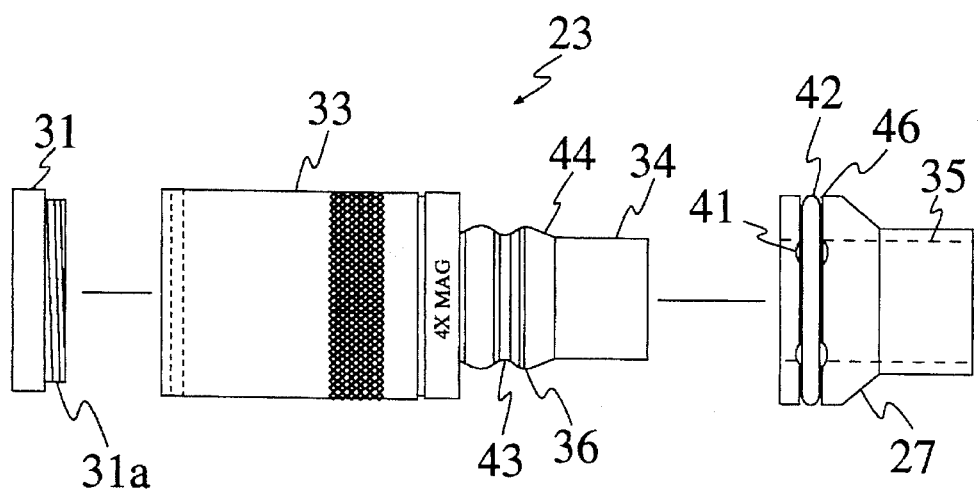
FIG. 4 is an exploded side view of an embodiment of the visual aid device of present invention.

Referring now to FIG. 4, an afocal telescope 33 is insertable into mounting adapter 27. Afocal telescope 33 has an insertion shank 34 that fits loosely into an interior bore 35 of mounting adapter 27. Insertion shank 34 has a profile 36 shaped to form an annular groove 43 and an annular bevel 44. One of a variety of different insert lenses 31 with threads 31a can be screwed into afocal telescope 23 to provide telescope 23 with a selectable focusing distance.

Figure 5:
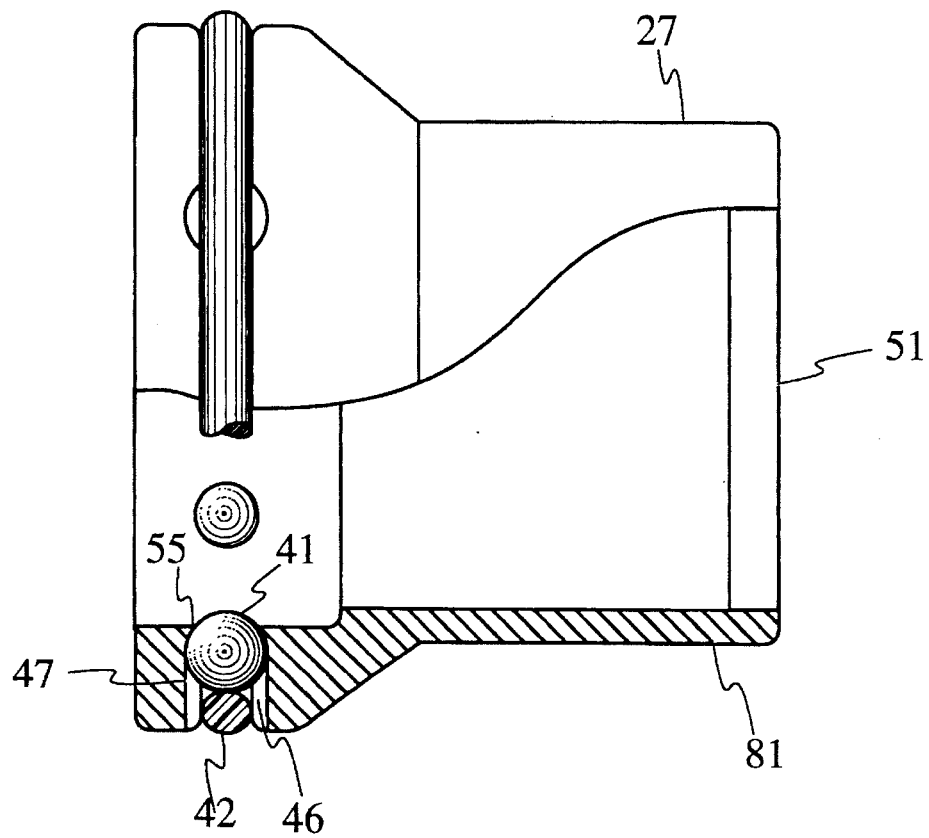
FIG. 5 is a detail view in partial section showing a mounting adapter according to an embodiment of the present invention.

Referring now also to FIG. 5, mounting adapter 27 has an annular O-ring groove 46, which holds an O-ring 42. O-ring 42 is made of resilient material and is held under tension in O-ring groove 46. Beneath O-ring 42 are balls 41, which are held under compression under O-ring 42. Balls 41 fit into radial ball channels 47 in mounting adapter 27. Balls 41 are urge toward, and partly into, interior bore 35 by O-ring 42. Ball openings 55 allow balls 41 to protrude slightly into interior bore 35. Balls 41 are preferably made of a self-lubricating material such as Nylon or Teflon. The number of balls 41 may be chosen as required for stability and easy use. According to the preferred embodiment described herein, the preferred number of balls 41 is six.

Figure 6:
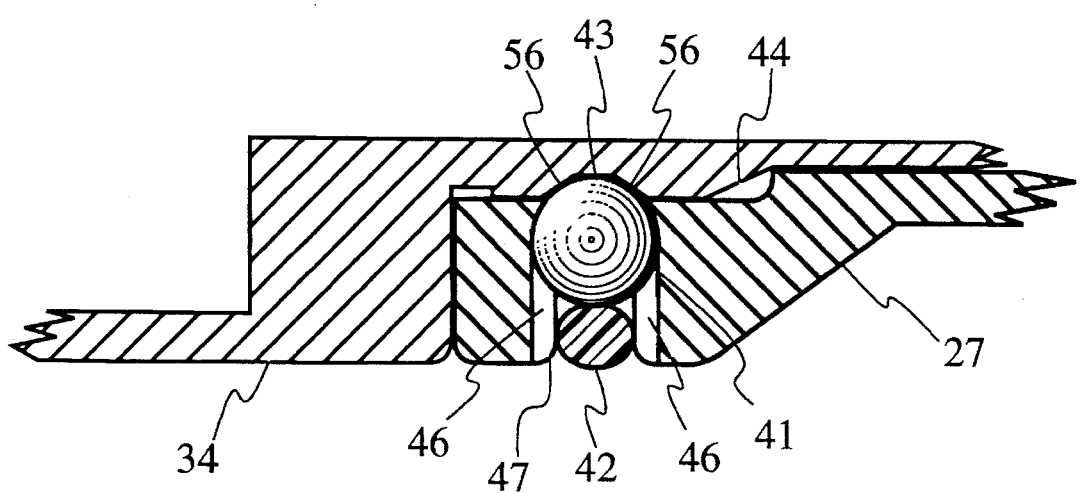
FIG. 6 is a closeup of the section of FIG. 5 showing a portion of a telescope of the visual aid device of FIG. 3 mounted therein.

Referring now to FIG. 6, as insertion shank 34 is inserted in interior bore 35, balls 41 ride easily up annular bevel 44, thereby stretching O-ring 42. When annular groove 43 is moved close enough to balls 41, balls 41 are urged into annular groove 43. As balls 41 move into annular groove 43, a positive force is applied to insertion shank 34 urging insertion shank 34 into interior bore 35. Annular groove bevels 56, at outer edges of annular groove 43, allow balls 41 to slide into annular groove 43 smoothly. In addition, annular groove bevels 56 allow insertion shank 34 to be removed by allowing balls 41 to ride up annular groove bevels 56 when insertion shank 34 is removed from interior bore 35. Thus, as full insertion of insertion shank 34 is approached and then reached, balls 41 snap into annular groove 43 providing an audible click and tactile feedback to the user.

As clearly shown in FIG. 6. annular groove bevel 56 is substantially steeper than annular bevel 44. The shallowness of annular bevel 44 permits insertion shank 34 to be inserted into interior bore 35 with a relatively low force. By contrast, the steepness of annular groove bevel 56 makes it necessary to apply a relatively great force to insertion shank 34 to remove insertion shank 34 from interior bore 35. The effect of the steepness of annular groove bevel 56 and the shallowness of annular bevel 44 is that optical fittings, such as telescope 23, require less force to insert into mounting adapter 27 than to remove therefrom. Thus telescope 23 cannot fall out of mounting adapter 27 while visual aid device 9 is in use.

The audible and tactile feedback provided by the snapping of balls 41 into annular groove 43 is particularly important to a user who has extremely poor sight. A user who relies on visual aid device 9 for correction of a profound visual defect, may be unable to see well enough with visual aid 9 removed to change telescopes 21, 23 easily. The audible and tactile feedback is an important feature for such a user.

If insertion shank 34 is inserted only partly into interior bore 35, the force exerted by balls 41 against annular bevel 44 tends to urge insertion shank 34 out of mounting adapter 27. Thus, in addition to making it easier to install optical devices into mounting adapters 25, 27, the mechanism of mounting adapter 27 and insertion shank 34 clearly shows any failure to obtain positive engagement between insertion shank 34 and mounting adapter 27. This is because if positive engagement is not established, the incomplete engagement permits insertion shank 34 to slip easily out of mounting adapter 27.

The design of mounting adapter 27 and insertion shank 34 permits telescope 23 to rotated freely while inserted in mounting adapter 27. This permits a rotational position of telescope 23 to be changed while the telescope is being used. This is useful because telescopes 21, 23 invariably incorporate some axial misalignment causing the lines of sight of telescopes 21, 23 to be different from the alignment for which the positions of mounting adapters 25, 27 are best suited. The effect of the axial misalignment can be reduced or eliminated by rotating telescopes 21, 23. For the same reason, different users may have anatomical eye positions which make it difficult for them to see through symmetrically arranged telescopes 21, 23. Independently rotating the slightly off-axis telescopes 21, 23 also makes it possible to compensate for this such anatomical asymmetry of the user.

Alternative methods of urging balls 41 into interior bore 35 may be employed. For example, a metal or plastic compression ring could be used place of O-ring 41. It is preferable, according to a feature of the present invention, for the means for urging balls 41 into interior bore 35 to permit balls 41 to be removed or installed. O-ring 41 has been found to be ideal for this purpose. Changing the number of balls 41 provides the user the ability to select the insertion force of insertion shank 34. Reducing the number of balls 41 reduces the insertion force and firmness of the attachment between mounting adapter 27 and insertion shank 27. Increasing the number of balls 41 increases the insertion force and firmness of the attachment between mounting adapter 27 and insertion shank 27.

A corrective lens 51 is fixedly mounted in posterior bore 81 of mounting adapter 27. This provides visual correction during viewing through telescope 23. Corrective lens 51 may also be used to provide protection from ultra-violet light, radiation and laser light through the use of various known optical coatings and treatments. Because corrective lens 51 remains in place when telescope 23 is removed, such protection is still provided with telescope 23 removed. Note, also, that lens 51 may be a plano lens when visual correction is not required by the user and such a plano lens may provide the same protection to the user.

Referring now also to FIG. 7, a diameter C' of a posterior bore 81 of mounting adapter 27 is smaller than a diameter B' of interior bore 35, creating a step 53 between them. Front portion 52 of insertion shank 34 has a diameter C which fits snugly in posterior bore 81 when insertion shank 34 is fully inserted into mounting adapter 34. Profile 36 has a diameter B which fits snugly in interior bore 35 when insertion shank 34 is fully inserted into mounting adapter 27. Thus, precise alignment is achieved when insertion shank 34 is fully inserted in mounting adapter 27. But because front portion 52 is substantially smaller than interior bore 35, insertion shank 34 is easy to align with interior bore 35 for insertion of insertion shank 34 into interior bore 35. This simplifies the changing of telescopes 23.

Afocal telescope 33 requires insert lens 31, which is threadably secured to afocal telescope 33, to become operable telescope 23. This is because an insert lens element 73 is essential for telescope 23 to form an image. In addition, by changing insert lens 31, a focusing distance of telescope 23 may be changed without changing the entire telescope 23.

According to one embodiment of the present invention, afocal telescope 33 contains a concave element 71 and convex main lens 72 to form an afocal portion of a Galilean telescope which is completed with the attachment of insert lens 31. Insert lens 31 contains a single insert lens element 73 that determines, within a specified range, the focusing distance of telescope 23. Corrective lens 51 remains attached to mounting adapter 27 frame 11 as do corrective carrier lenses 17, 19, so that all elements specific to the user are attached to frame 11. All other elements, afocal telescope 33 and insert lens 31, are interchangeable.

According to another embodiment (not shown) afocal telescope 33 includes reflective or refractive elements to increase a light path and thereby accommodate a main lens 72 with a longer focal length. By increasing the focal length of main lens 72, the magnification of the resulting telescope 23 can be increased. For example, a reflective element such as a roof prism may be used in afocal telescope 33 forming a Capellarian telescope, once insert lens 31 is attached. As in the other embodiments, the focusing distance of the Capellarian telescope can be changed by changing insert lens 31.

Changing insert lens 31 changes the optical characteristics of telescope 23. By permitting the changing of insert lens 31, the invention allows a single afocal telescope to serve in a range of applications. For example, if the user needs to change the distance at which telescopes 21, 23 focus, the user can obtain additional insert lenses 31 instead of obtaining an entire telescopes 21, 23. If greater change in optical characteristics is required than can be effected by changing insert lens 31, afocal telescope 33 can be changed without changing frame 11, carrier lenses 17, 19, or mounting adapters 25, 27. Interchangeable insert lens 31 and telescope 23, 25 permit a range of optical characteristics to be enjoyed by the user with the purchase of a minimum of costly elements. In addition, customized elements, such as corrective lens 51 and carrier lenses 17, 19, are permanently attached to frame 11. The other components, telescopes 21, 23, and insert lens 31, can be used by different users and interchanged at will. This interchangeability permits a group of users to share, for a relatively low cost, a supply of devices that have a range of optical characteristics.

According to the embodiments of the invention described, a visual aid device may include a pair of telescopes 21, 23. It is possible to incorporate some or all of the features of the invention in an embodiment having only one telescope. In addition, according to the embodiments described, mounting adapter 27 is fixedly secured to carrier lenses 17, 19. However, it is possible to incorporate some or all of the features of the present invention in other embodiments having other means for supporting mounting adapter 27 in a line of sight of a user. For example, a frame connected directly to mounting adapter 27 could be employed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A visual aid, comprising:

a mounting adapter, having an opening;

means for supporting said mounting adapter within a line of sight of a user;

an optical device having an insertion shank at an end thereof;

said insertion shank being insertable in said mounting adapter;

means for engaging said insertion shank in said mounting adapter upon application of an insertion force to said insertion shank while said insertion shank is inserted in said opening;

said means for engaging including means for disengaging said insertion shank upon application of an extraction force to said insertion shank while said insertion shank is inserted in said opening; and said means for engaging including means for requiring that said insertion force is lower in magnitude than said extraction force.

2. Apparatus as in claim 1, wherein said means for engaging includes means for permitting said optical device to rotated about an axis thereof.

3. Apparatus as in claim 1, wherein said means for engaging includes means for permitting adjustment of said insertion force.

4. Apparatus as in claim 1, wherein said means for engaging includes:

an engaging member in said mounting adapter;

means for urging said engaging member partly into said opening; and an edge on said insertion shank for engaging said engaging member.

5. Apparatus as in claim 4, wherein: an outer diameter of a front portion of said insertion shank is substantially smaller than an inner diameter of a front portion of said opening; and said front portion fits closely within a posterior portion of said opening when said insertion shank is inserted in said mounting adapter.

6. Apparatus as in claim 4, wherein said means for engaging includes:

an annular profile on said insertion shank;

said insertion shank having an axis;

said annular profile including a first annular bevel concentric with said axis;

said edge on said insertion shank having a portion at a first radial distance from said axis;

said first annular bevel running from a first circle at said first radial distance to a second circle at a second radial distance from said axis; and said second radial distance being less than said first radial distance.

7. Apparatus as in claim 6, wherein said means for engaging includes:

a second bevel on said insertion shank;

said second bevel running from a third circle at said first radial distance from said axis to a fourth circle at a third radial distance from said axis;

said first bevel having a first slope;

said second bevel having a second slope;

said first slope being less than said second slope;

said engaging member riding up said first bevel when said insertion shank is inserted into said opening;

said engaging member riding down said second bevel when said insertion shank is inserted into said opening;

said engaging member riding up said second bevel when said insertion shank is withdrawn from said opening; and said engaging member riding down said first bevel when said insertion shank is withdrawn from said opening.

8. Apparatus as in claim 7, wherein said engaging member is a Teflon ball.

9. Apparatus as in claim 1, wherein said means for engaging includes:

a plurality of engaging members in said mounting adapter;

means for urging said plurality of engaging members partly into said opening;

means for permitting at least one of said engaging members to be removed from said mounting adapter; and means for permitting said at least one of said engaging members to be replaced in said mounting adapter.

10. Apparatus as in claim 1, wherein said means for engaging includes:

a resilient member;

means for transmitting a force of said resilient member to said insertion shank effective to generate said insertion force; and said means for transmitting a force including at least one element, removal of which is effective to reduce said insertion force.

11. A visual aid, comprising:

a spectacle frame;

a mounting adapter;

means for fixedly attaching said mounting adapter to said spectacle frame;

said mounting adapter having an interior bore, an annular outer wall and a center axis;

at least one engaging member movably connected to said mounting adapter;

means for urging said at least one engaging member partly into said interior bore;

an optical device having an insertion shank;

said insertion shank being insertable into said interior bore;

said insertion shank having an annular edge for engaging said at least one engaging member when said insertion shank is inserted in said interior bore; and said insertion shank having an annular groove into which said at least one engaging member snaps when said insertion shank is fully inserted into said interior bore.

12. Apparatus as in claim 11, wherein:

said mounting adapter includes a corrective lens; and said corrective lens is shaped to provide visual correction for said user.

13. Apparatus as in claim 12, wherein:

said optical device includes a removable optical element; and said removable optical element being effective to establish a focus distance of said optical device.

14. Apparatus as in claim 11, wherein:

said optical device includes a removable optical element; and said removable optical element being effective to establish a focus distance of said optical device.

15. Apparatus as in claim 11, wherein:

said mounting adapter includes an annular groove in said annular outer wall;

said outer groove surrounds said center axis;

at least one opening penetrates said outer wall at a position in said outer groove;

said at least one engaging member is movably held in said at least one opening;

said means for urging includes a resilient O-ring in said outer groove;

said at least one engaging member lies beneath said resilient O-ring; and said at least one engaging member has a spherical shape.

16. Apparatus as in claim 15, wherein said at least one engaging member is one of a Nylon ball and a Teflon ball.

17. A visual aid, comprising:

a wearable frame;

an afocal telescope;

said afocal telescope including a telescope barrel;

a main lens in said afocal telescope;

an insert lens attachable to said afocal telescope;

a mounting adapter attached to said wearable frame;

said mounting adapter having means for attaching a corrective lens on said mounting adapter;

said mounting adapter having an opening;

said afocal telescope, with said insert lens attached, being capable of bringing a subject into focus for said normally-sighted user of said visual aid;

said afocal telescope having an insertion shank at an end thereof;

said insertion shank being insertable in said opening in said mounting adapter;

means for engaging said insertion shank upon application of an insertion force to said insertion shank while said insertion shank is inserted in said opening;

said means for engaging including means for disengaging said insertion shank upon application of an extraction force to said insertion shank while said insertion shank is inserted in said opening; and means for making said insertion force lower in magnitude than said extraction force.

18. Apparatus as in claim 17, wherein said means for engaging includes:

an engaging member in said mounting adapter;

means for urging said engaging member into said opening; and an edge on said insertion shank for engaging said engaging member.

19. Apparatus as in claim 18, wherein:

said engaging member has a spherical shape; and said means for urging includes a resilient O-ring encircling said opening.

20. Apparatus as in claim 18, wherein said means for engaging includes:

an annular profile on said insertion shank;

said insertion shank having an axis;

said annular profile including a first annular bevel concentric with said axis;

said edge on said insertion shank having a portion at a first radial distance from said axis;

said first annular bevel running from a first circle at said first radial distance to a second circle second radial distance from said axis; and said second radial distance being less than said first radial distance.

21. Apparatus as in claim 18, wherein:

an outer diameter of a front portion of said insertion shank is substantially smaller than an inner diameter of said interior bore; and said front portion fits closely within a posterior portion of said interior bore when said insertion shank is inserted in said mounting adapter.

22. A visual aid comprising:

a mounting adapter;

means for supporting said mounting adapter in a line of sight of a user;

an optical device;

means for attaching said optical device in said mounting adapter by a linear movement of said optical device toward said mounting adapter, and for removing said optical device from said mounting adapter;

said means for attaching including means for locking said optical device in a locking position in said mounting adapter when said optical device is fully attached in said mounting adapter;

said locking resulting from said linear movement and said means for attaching including means for requiring a greater force to remove said optical device from said locking position than for attaching said optical device in said locking position.

23. A visual aid, comprising:

a wearable frame;

a mounting adapter affixed to said wearable frame;

a telescope;

said mounting adapter including means for rotatably connecting said telescope to said mounting adapter;

said means for rotatably connecting being effective to permit rotation of said telescope while said telescope is connected to said mounting adapter;

said means for rotatably connecting including means for permitting removal of said telescope from said mounting adapter.

* * * * *